United States Patent
Iizuka et al.

(10) Patent No.: US 11,837,837 B2
(45) Date of Patent: Dec. 5, 2023

(54) HOLDER WHICH SUPPORTS AND RESTRICTS ROTATION OF A NUT ATTACHED TO A TERMINAL BLOCK HOUSING

(71) Applicant: Yazaki Corporation, Tokyo (JP)

(72) Inventors: Hayato Iizuka, Shizuoka (JP); Yasuhiro Otsuta, Shizuoka (JP); Yuki Hiruta, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/843,337

(22) Filed: Jun. 17, 2022

(65) Prior Publication Data

US 2022/0407245 A1    Dec. 22, 2022

(30) Foreign Application Priority Data

Jun. 22, 2021 (JP) ................. 2021-102838

(51) Int. Cl.
*H01R 9/24* (2006.01)
*H01R 4/34* (2006.01)

(52) U.S. Cl.
CPC ........... *H01R 9/24* (2013.01); *H01R 4/34* (2013.01)

(58) Field of Classification Search
CPC ...... H01R 9/24; H01R 9/2408; H01R 9/2491; H01R 4/34; H01H 2011/0037
See application file for complete search history.

(56) References Cited

U.S. PATENT DOCUMENTS

| 9,484,647 | B2 * | 11/2016 | Ishikawa ................. H01R 9/24 |
| 2010/0034613 | A1 | 2/2010 | Sakakura et al. |
| 2015/0079855 | A1 | 3/2015 | Takemura |
| 2017/0229788 | A1 | 8/2017 | Takahashi et al. |

FOREIGN PATENT DOCUMENTS

| JP | 58-183778 U | 12/1983 |
| JP | 5-25665 U | 4/1993 |
| JP | 2010-40440 A | 2/2010 |
| JP | 2015-60680 A | 3/2015 |
| JP | WO2016/035476 A1 | 3/2016 |

* cited by examiner

*Primary Examiner* — Vanessa Girardi
(74) *Attorney, Agent, or Firm* — Sughrue Mion, PLLC

(57) ABSTRACT

A terminal block includes: a busbar including a first terminal portion and a second terminal portion, the first terminal portion having a through hole; a housing that holds the busbar and has a storage chamber; a nut stored in the storage chamber; and a holder including a support unit that supports the nut, the holder configured to be attached to the housing, in which the storage chamber has wall surfaces facing individual side surfaces of the nut, the storage chamber configured to restrict rotation of the nut by using the wall surfaces of the storage chamber, and the support unit is positioned on a side opposite to a side of the first terminal portion with respect to the nut, the support unit configured to support the nut by setting a threaded hole of the nut to face the through hole.

9 Claims, 16 Drawing Sheets

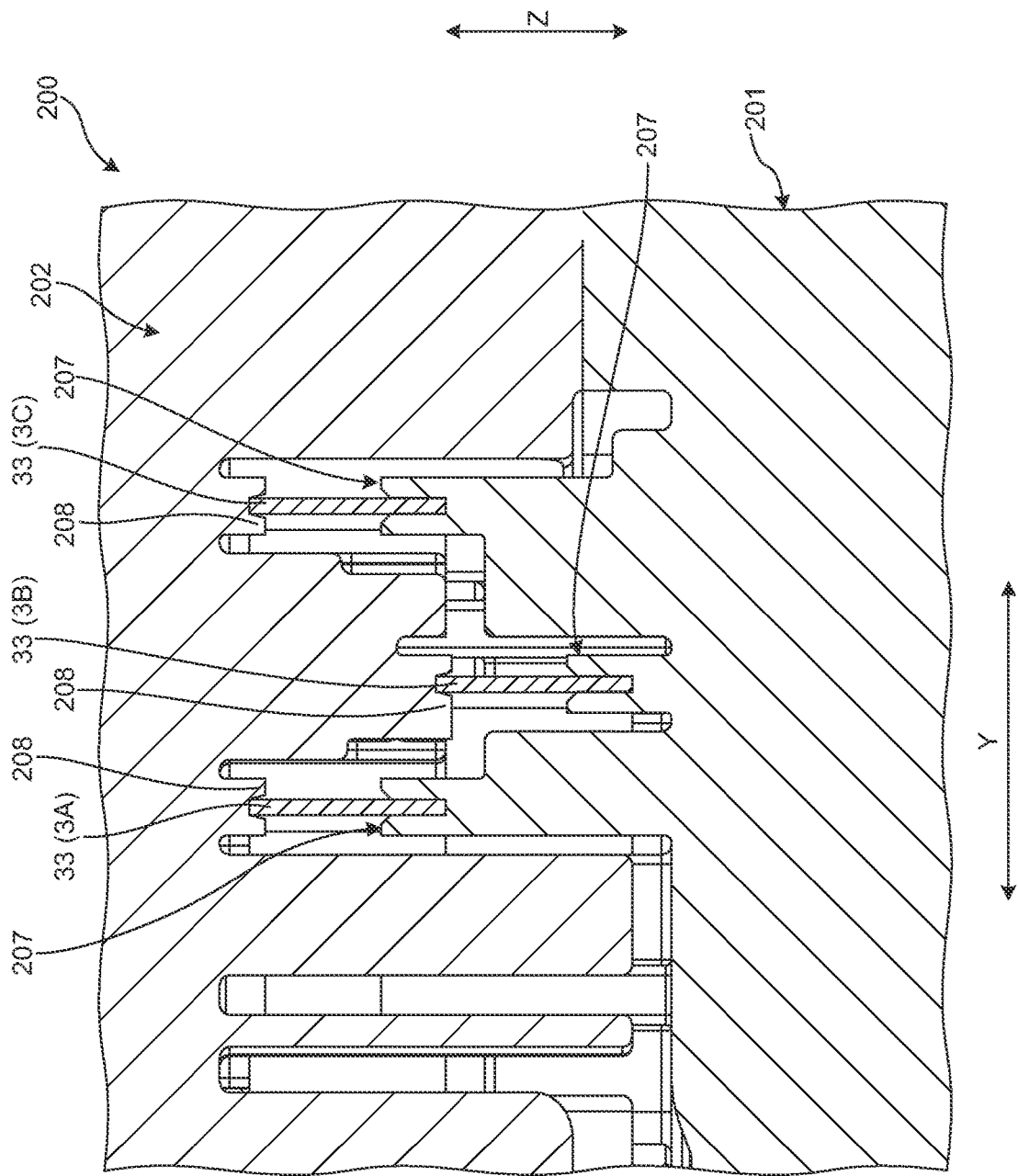

HOLDER WHICH SUPPORTS AND RESTRICTS ROTATION OF A NUT ATTACHED TO A TERMINAL BLOCK HOUSING

CROSS-REFERENCE TO RELATED APPLICATION(S)

The present application claims priority to and incorporates by reference the entire contents of Japanese Patent Application No. 2021-102838 filed in Japan on Jun. 22, 2021.

BACKGROUND OF THE INVENTION

1. Field of the Invention

The present invention relates to a terminal block.

2. Description of the Related Art

There is a conventionally known housing that stores a nut. Japanese Patent Application Laid-open No. 2010-40440 discloses a housing equipped with a nut storage that stores a nut, the nut storage including: a main body portion having a bolt insertion hole into which a bolt is inserted; and a wedge portion protruding toward outside of the bolt insertion hole in the radial direction from the main body portion.

With the configuration of Japanese Patent Application Laid-open No. 2010-40440, the storage is enlarged depending on the shape of the protruding wedge portion. In a terminal block having a housing that stores a nut, it is desirable to achieve downsizing of the housing.

SUMMARY OF THE INVENTION

An object of the present invention is to provide a terminal block capable of achieving downsizing of a housing.

A terminal block according to one aspect of the present invention includes a busbar including a first terminal portion and a second terminal portion, the first terminal portion formed in a plate-like shape and having a through hole; a housing that holds the busbar and has a storage chamber facing the first terminal portion in an axial direction of the through hole; a nut stored in the storage chamber; and a holder including a support unit that supports the nut, the holder configured to be attached to the housing, wherein the storage chamber has wall surfaces facing individual side surfaces of the nut, the storage chamber configured to restrict rotation of the nut by using the wall surfaces of the storage chamber, and the support unit is positioned on a side opposite to a side of the first terminal portion with respect to the nut, the support unit configured to support the nut by setting a threaded hole of the nut to face the through hole.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a cross-sectional view of the mold at the stage of being set the mold according to the embodiment taken along line XIX in FIG. 16.

DETAILED DESCRIPTION OF THE PREFERRED EMBODIMENTS

Hereinafter, a terminal block according to an embodiment of the present invention will be described in detail with reference to the drawings. Note that the present invention is not limited by this embodiment. Moreover, components in the following embodiment include those that are easily conceivable for those skilled in the art or substantially identical.

EMBODIMENT

Figure 1:
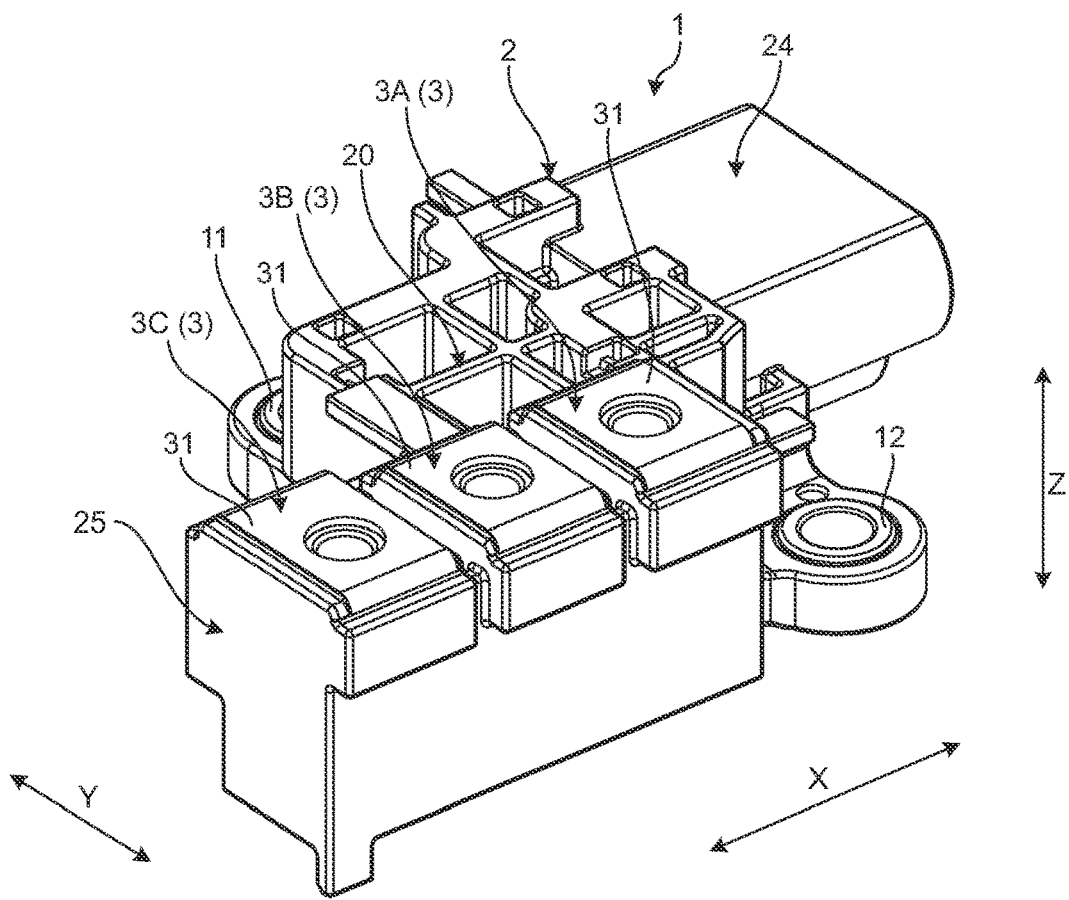
FIG. 1 is a perspective view of a terminal block according to an embodiment.
Figure 2:
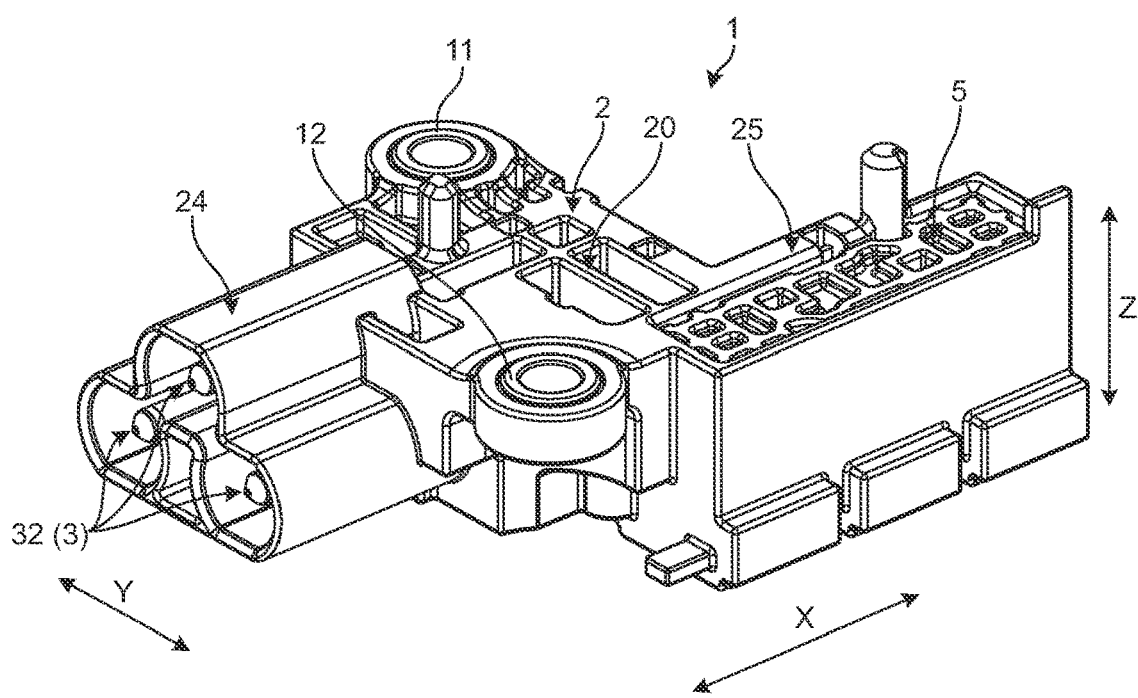
FIG. 2 is a perspective view of the terminal block according to the embodiment.
Figure 3:
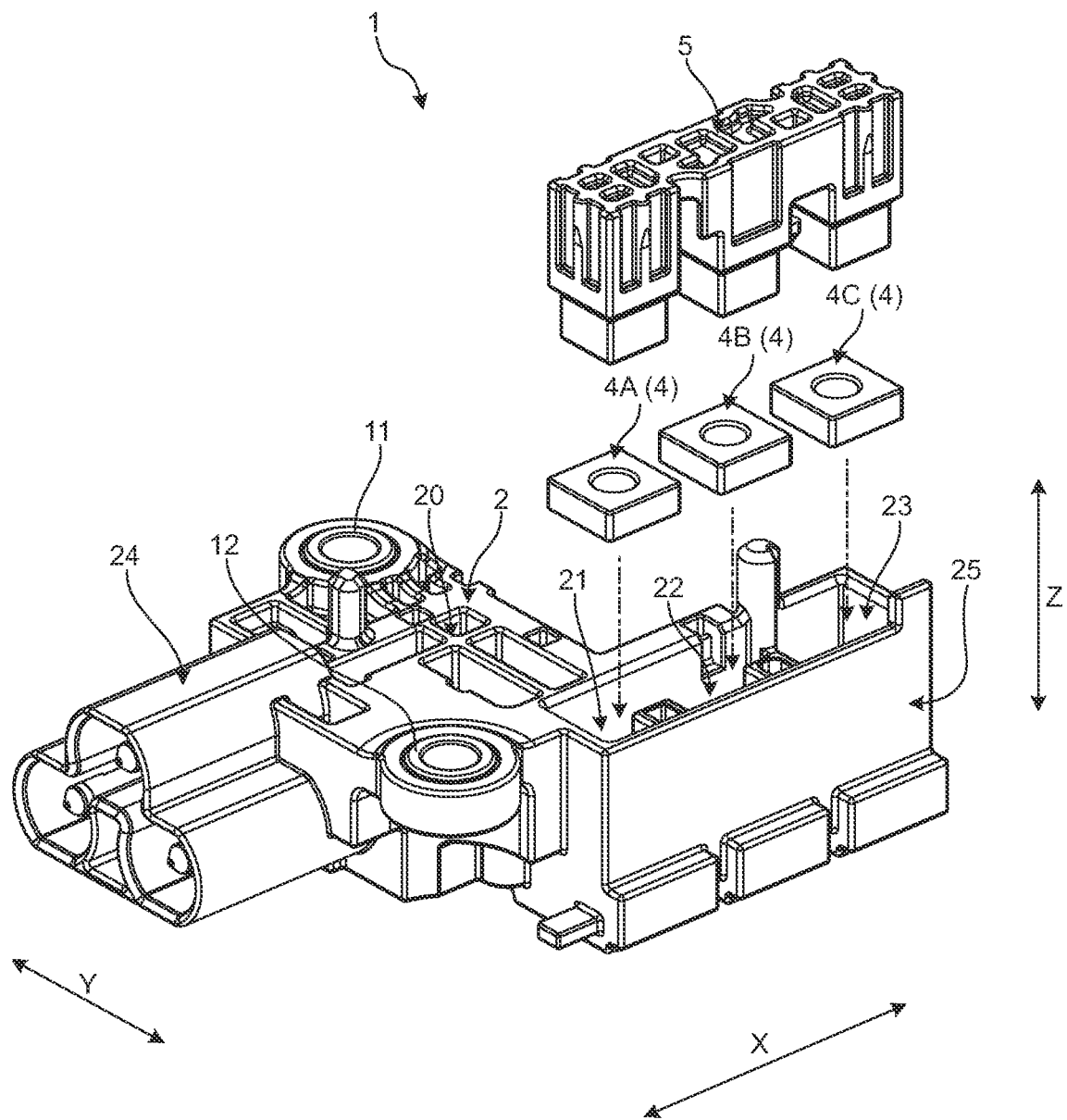
FIG. 3 is an exploded perspective view of the terminal block according to the embodiment.
Figure 4:
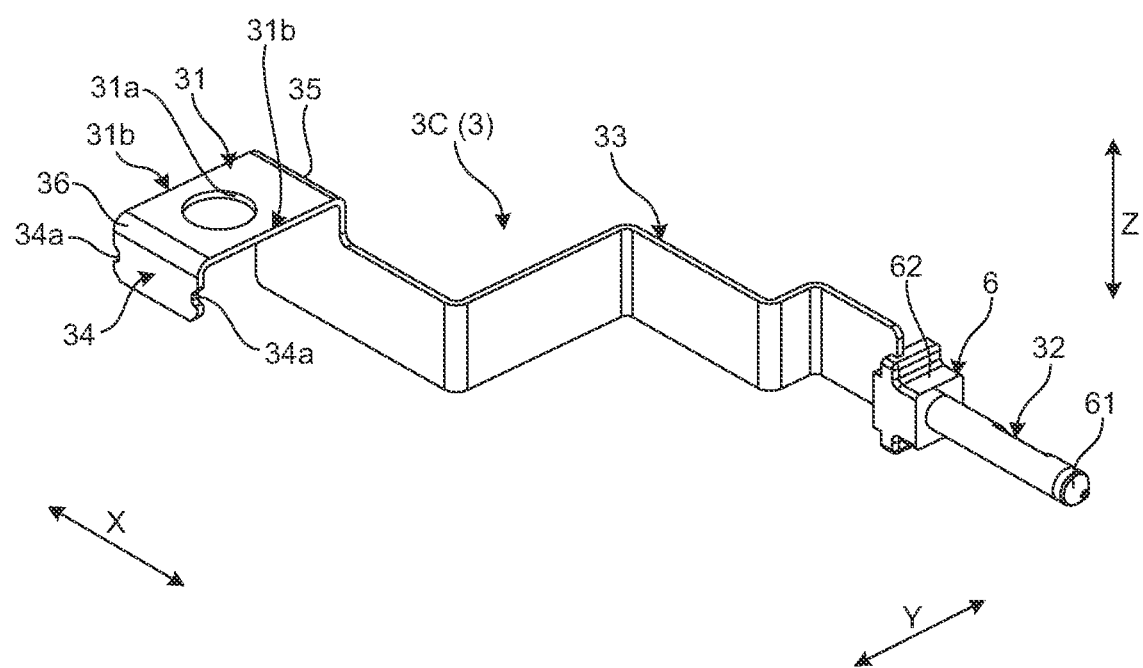
FIG. 4 is a perspective view of a busbar according to the embodiment.
Figure 5:
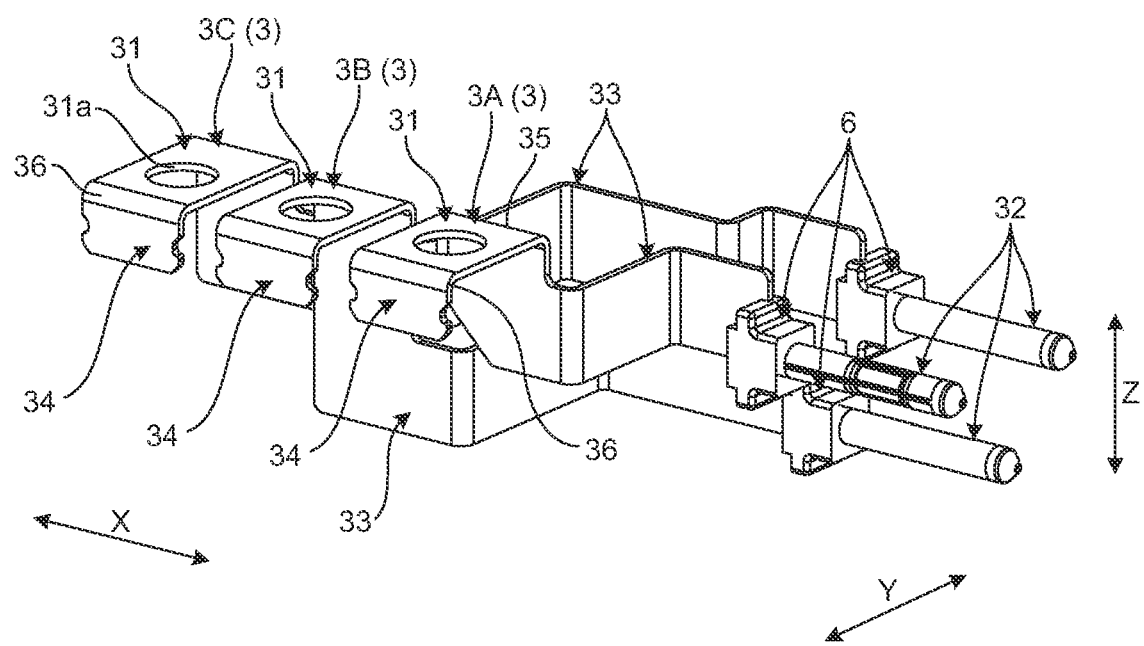
FIG. 5 is a perspective view of the busbar according to the embodiment.
Figure 6:
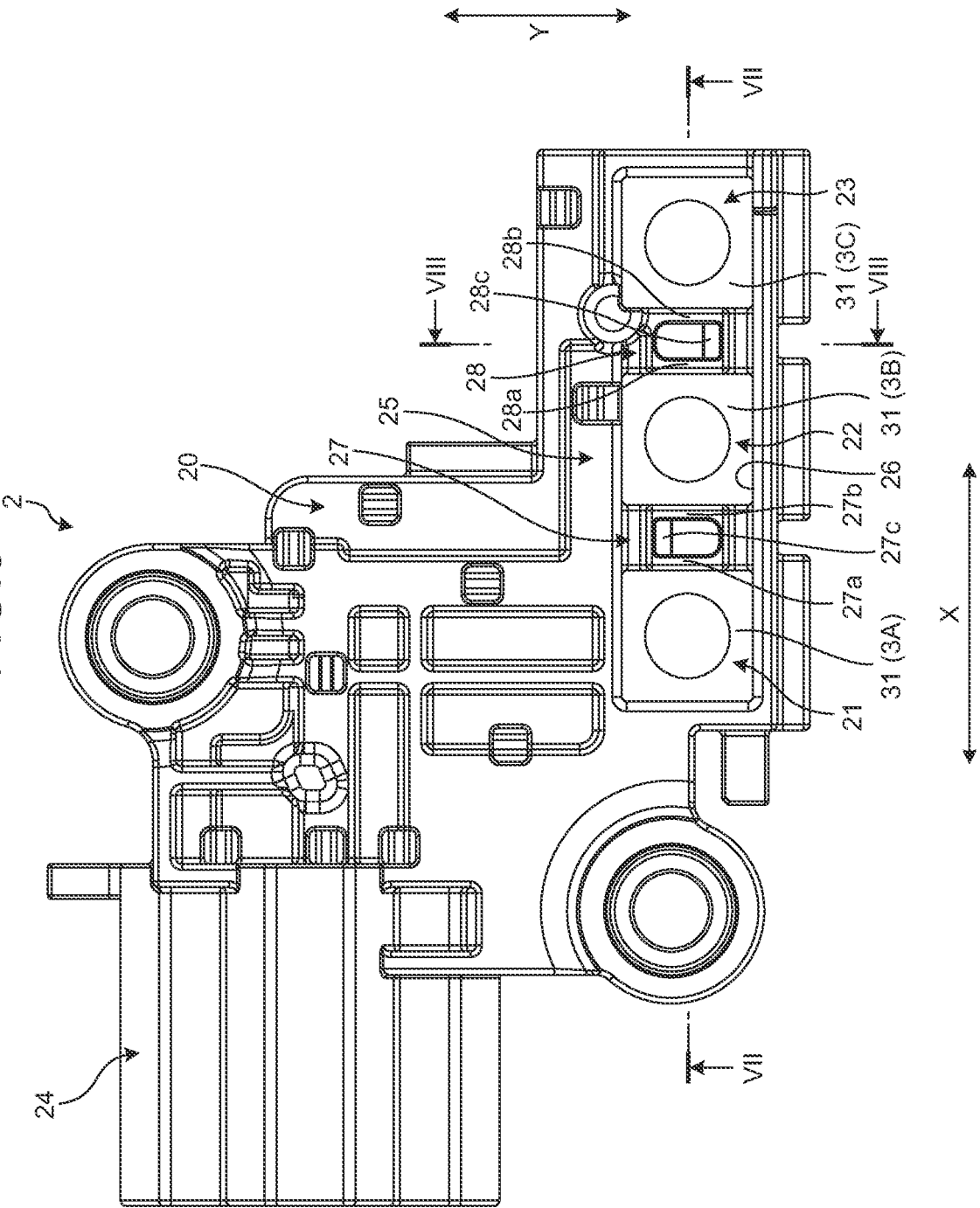
FIG. 6 is a plan view of the housing according to the embodiment.
Figure 7:
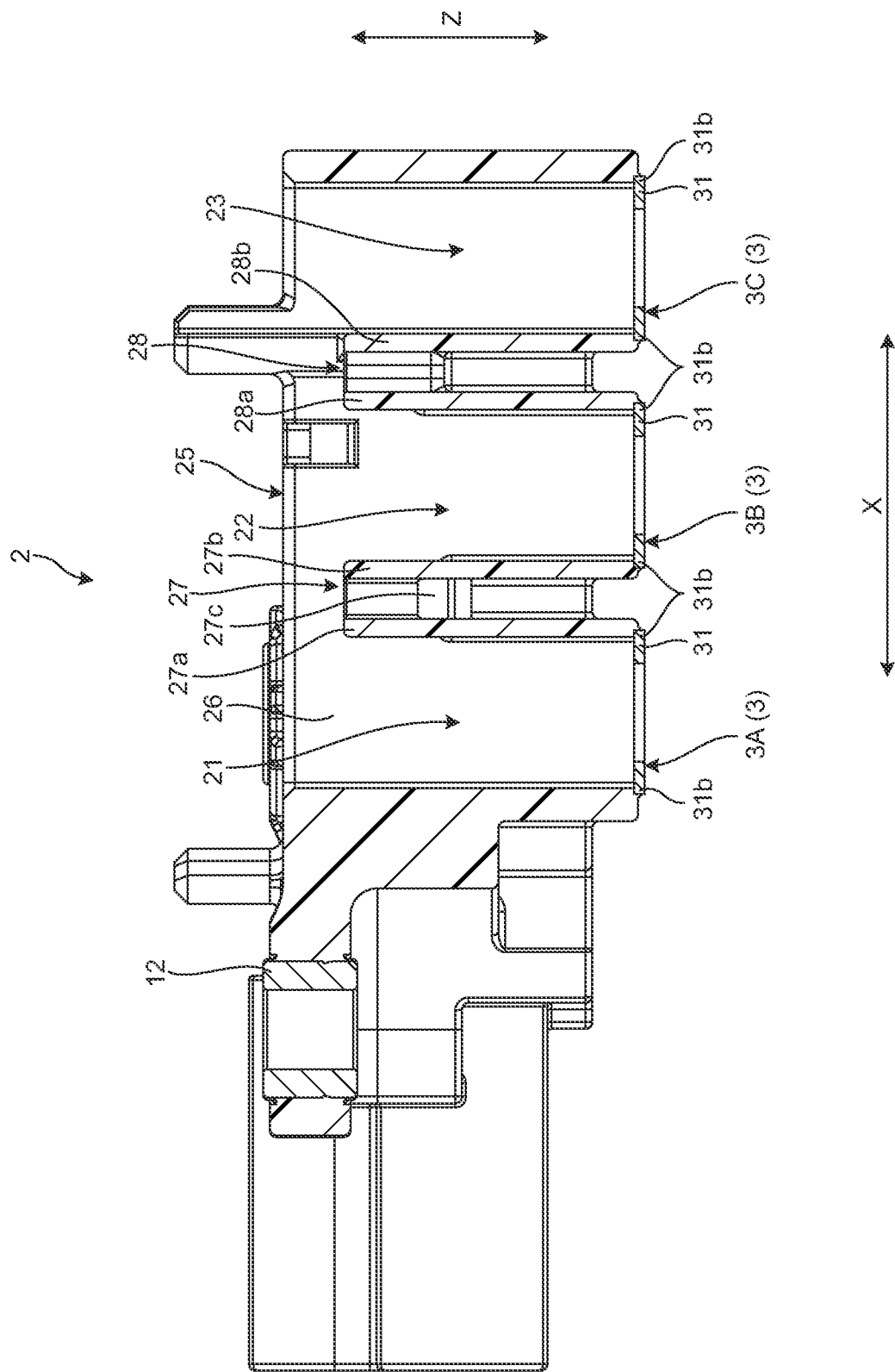
FIG. 7 is a cross-sectional view of the housing before the holder is engaged with the housing according to the embodiment taken along line VII in FIG. 6.
Figure 8:
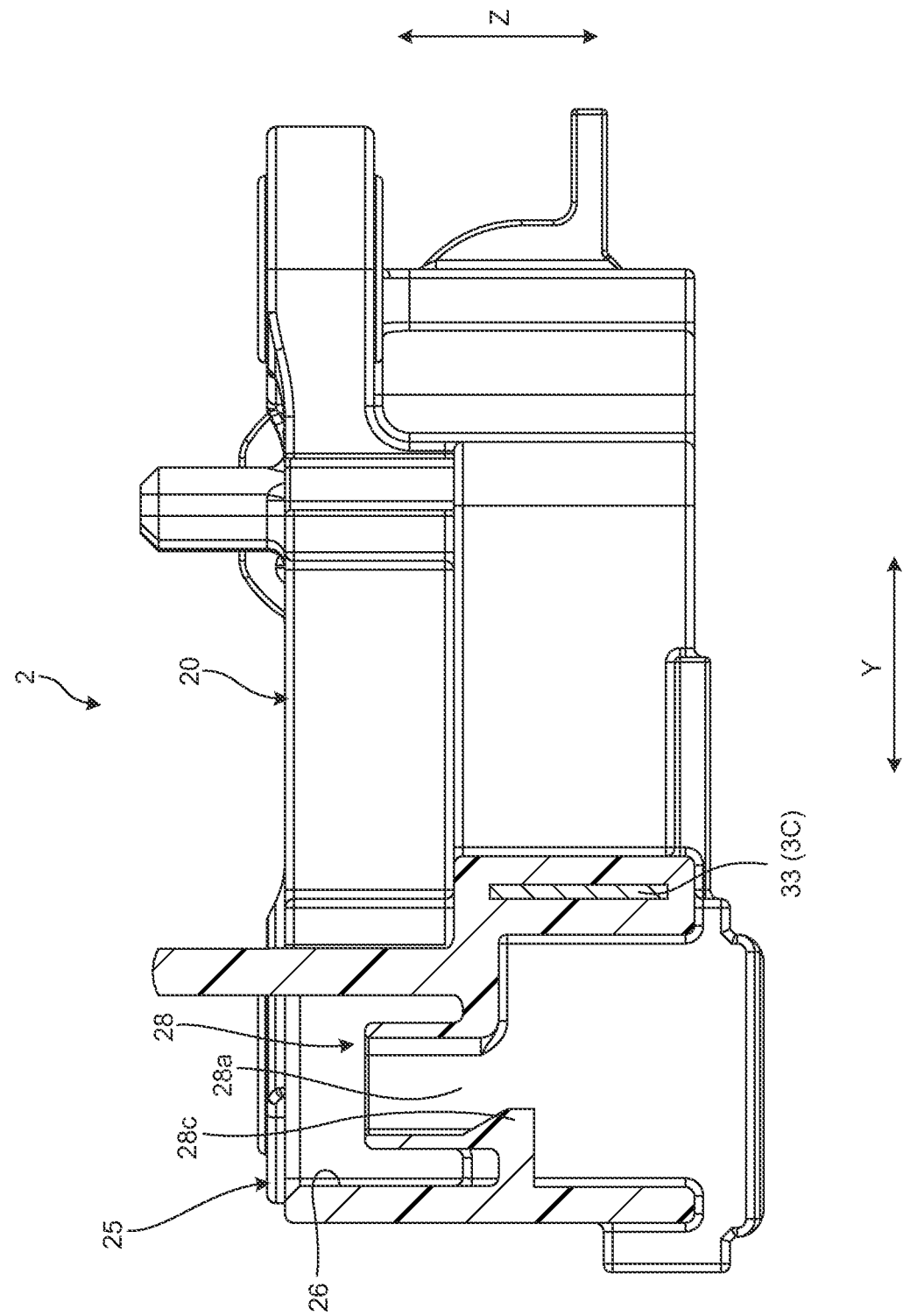
FIG. 8 is a cross-sectional view of the housing according to the embodiment taken along line VIII in FIG. 6.
Figure 9:
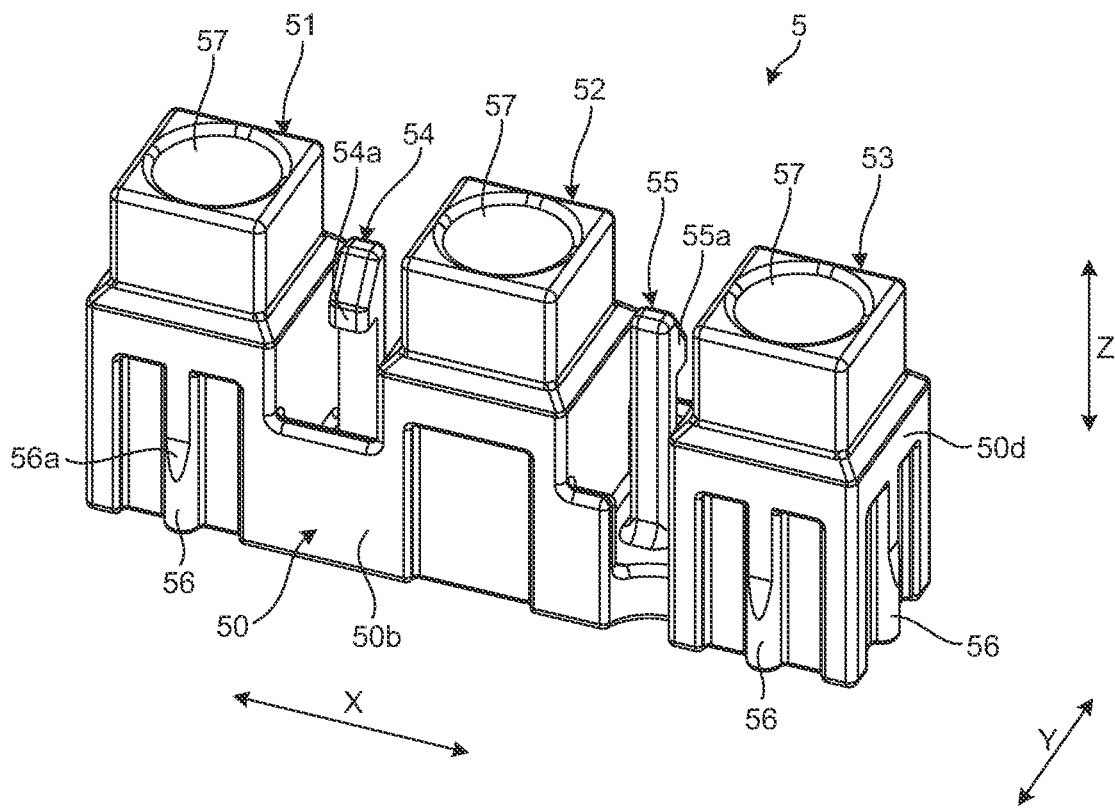
FIG. 9 is a perspective view of a holder according to the embodiment.
Figure 10:
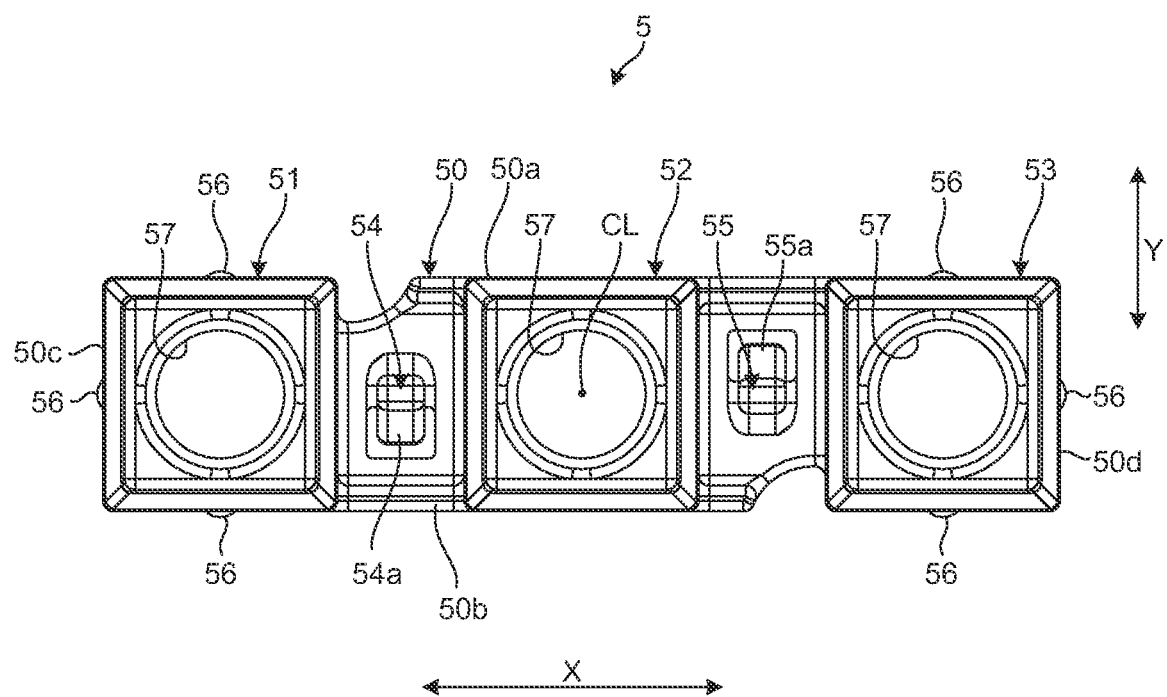
FIG. 10 is a plan view of the holder according to the embodiment.

An embodiment will be described with reference to FIGS. 1 to 19. The present embodiment relates to a terminal block. FIGS. 1 and 2 are perspective views of a terminal block according to the embodiment; FIG. 3 is an exploded perspective view of the terminal block according to the embodiment; FIGS. 4 and 5 are perspective views of a busbar according to the embodiment; FIG. 6 is a plan view of a housing according to the embodiment; FIGS. 7 and 8 are cross-sectional views of the housing according to the embodiment; FIG. 9 is a perspective view of a holder according to the embodiment; and FIG. 10 is a plan view of the holder according to the embodiment. FIGS. 11 to 14 are cross-sectional views of the terminal block according to the embodiment; FIGS. 15 to 18 are perspective views of a mold according to the embodiment; and FIGS. 19 and 20 are cross-sectional views of the mold according to the embodiment.

Figure 11:
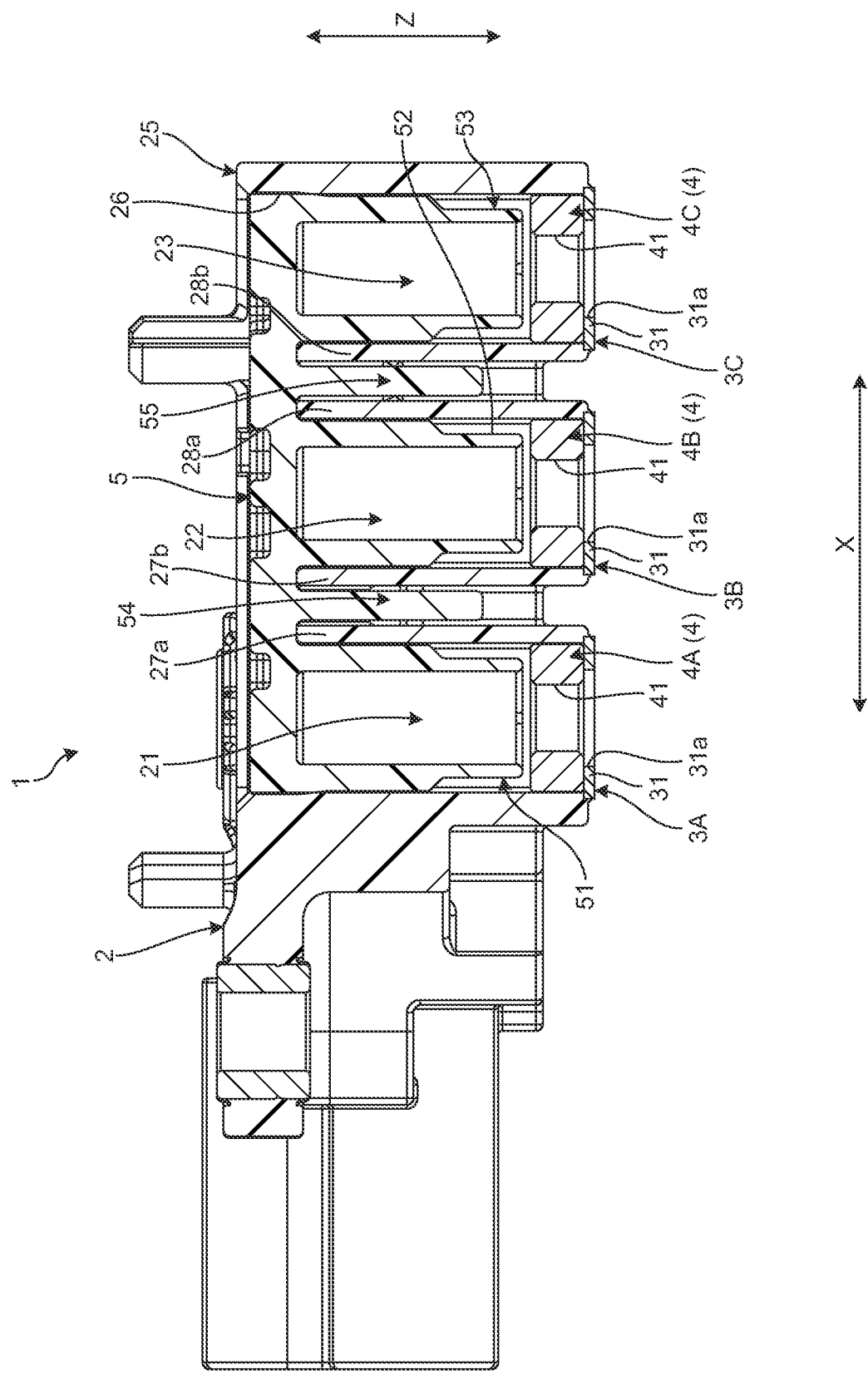
FIG. 11 is a cross-sectional view of the terminal block after the nuts are stored in the storage chambers and the holder is engaged with the housing according to the embodiment taken along line VII in FIG. 6.
Figure 12:
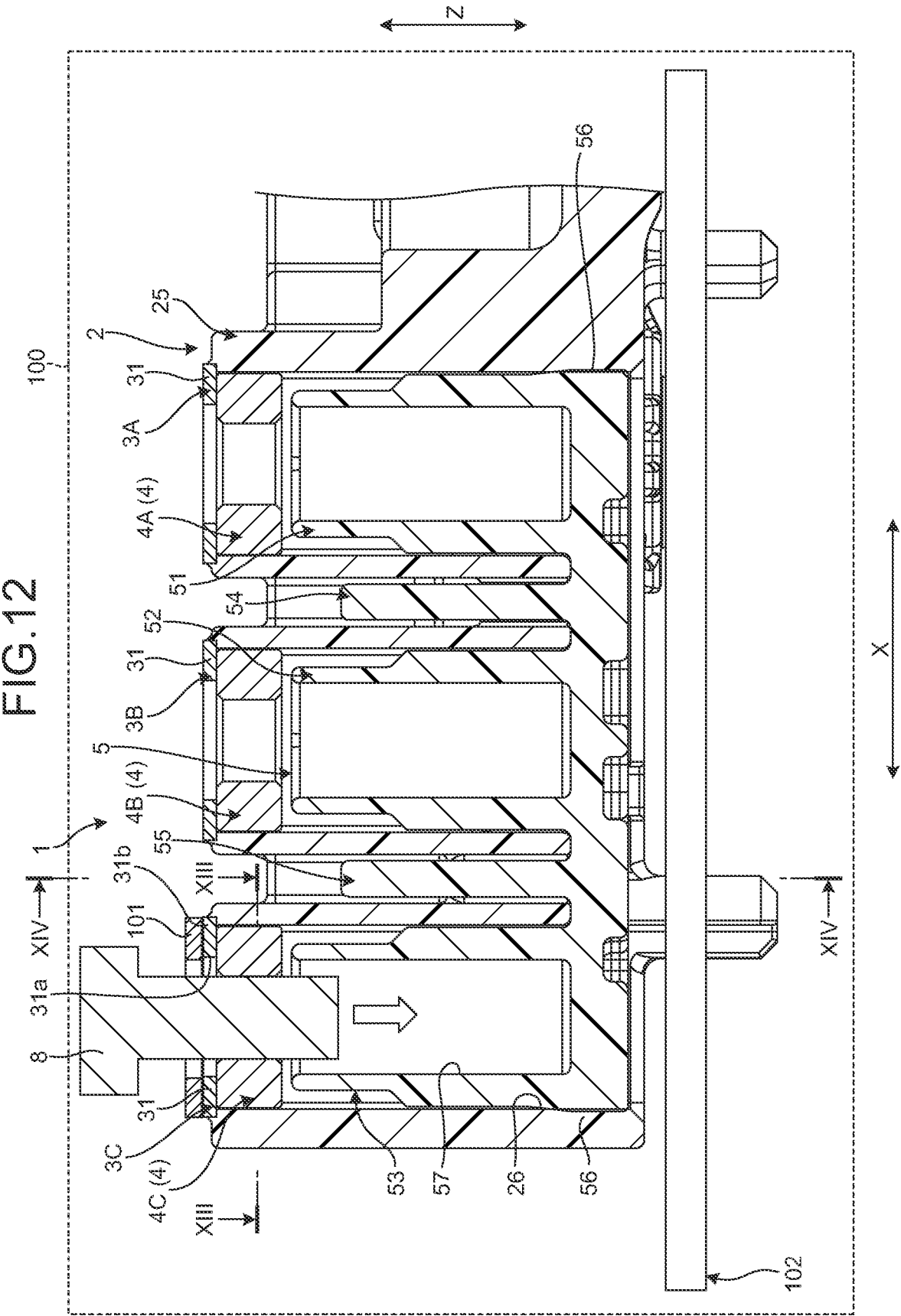
FIG. 12 is a cross-sectional view of the terminal block after being assembled to the device according to the embodiment taken along line VII in FIG. 6.
Figure 13:
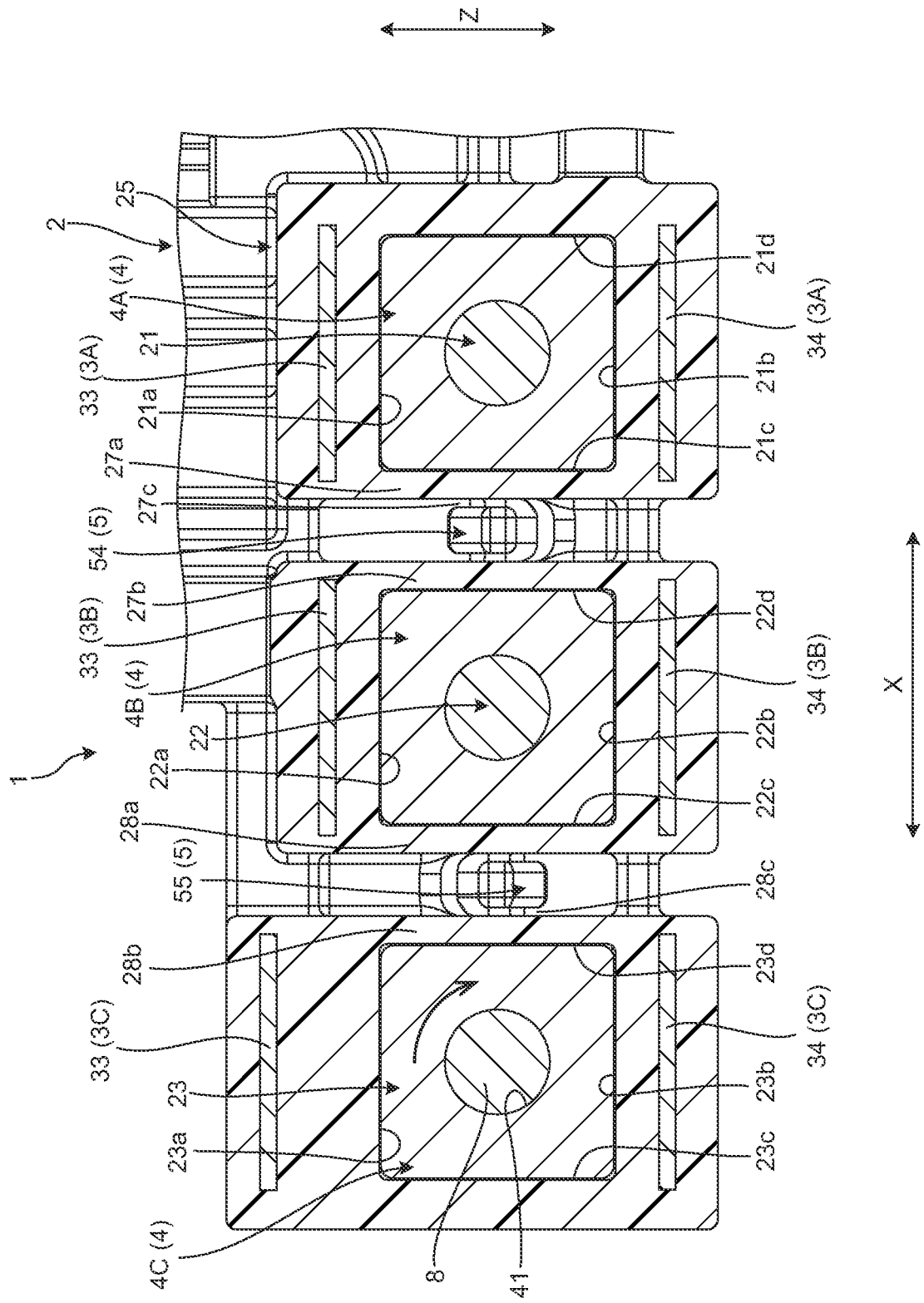
FIG. 13 is a cross-sectional view of the terminal block according to the embodiment taken along line XIII in FIG. 12.
Figure 14:
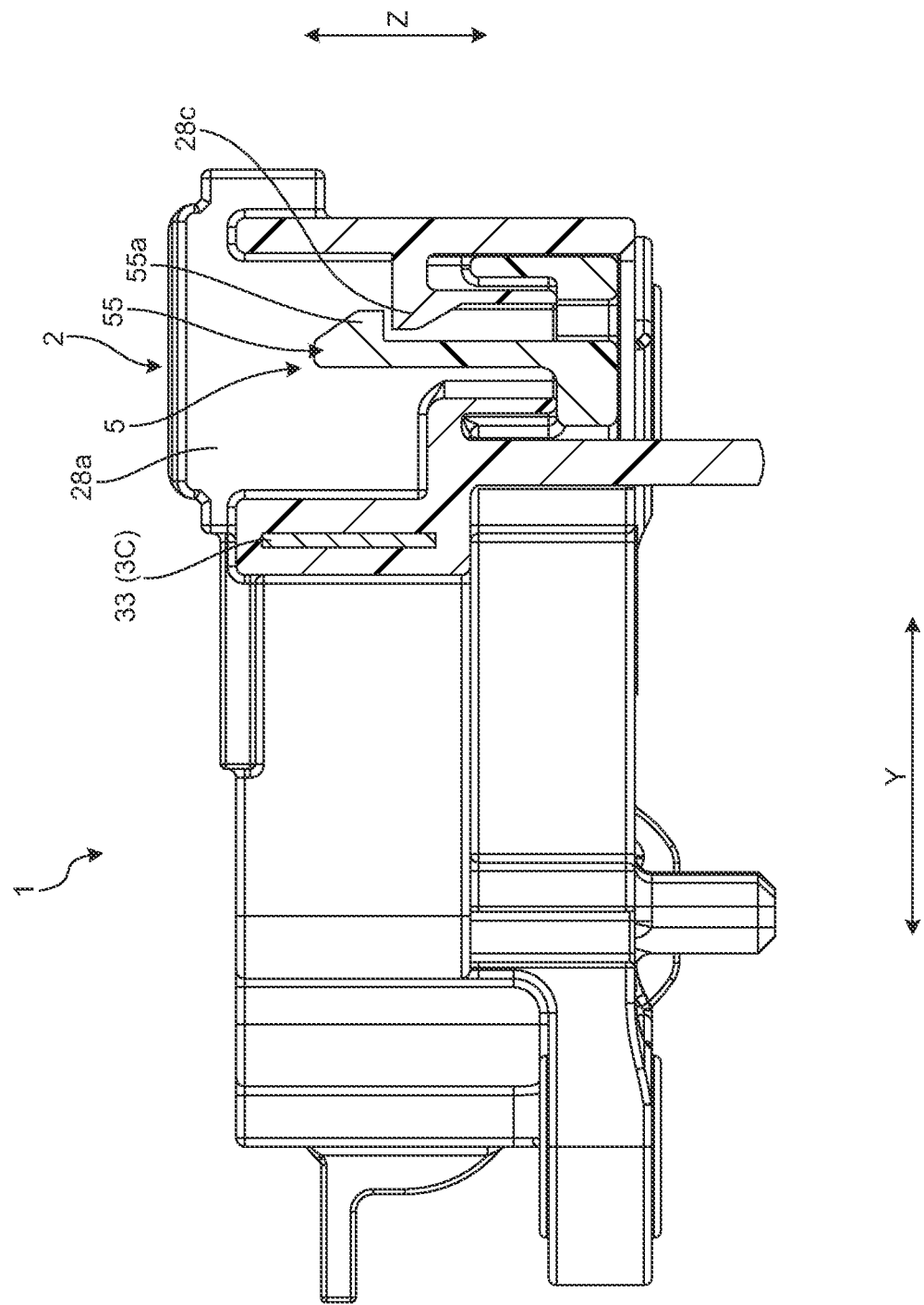
FIG. 14 is a cross-sectional view of the terminal block according to the embodiment taken along line XIV in FIG. 12.

FIG. 7 illustrates a cross section taken along line VII-VII of FIG. 6. FIG. 8 illustrates a cross section taken along line VIII-VIII of FIG. 6. FIGS. 11 and 12 illustrate a cross section at the same position as FIG. 7. FIG. 13 illustrates a cross section taken along line XIII-XIII of FIG. 12. FIG. 14 illustrates a cross section taken along line XIV-XIV in FIG. 12.

As illustrated in FIGS. 1 to 3, the terminal block 1 of the present embodiment includes a housing 2, a busbar 3, a nut 4, and a holder 5. The terminal block 1 may include a plurality of busbars 3 and a plurality of nuts 4. In the illustrated example, the terminal block 1 includes three busbars 3, namely, a busbar 3A, a busbar 3B, and a busbar 3C. In addition, the terminal block 1 includes three nuts 4A, 4B, and 4C corresponding to the busbars 3A, 3B, and 3C, respectively. The three busbars 3A, 3B, and 3C correspond to each of three phases AC current, namely, a V phase, a U phase, and a W phase, for example.

The housing 2 is a member that holds the busbar 3, and is formed of an insulating synthetic resin, for example. In the illustrated example, the housing 2 is molded integrally with the three busbars 3A, 3B, and 3C and two collars 11 and 12.

As illustrated in FIG. 3, the housing 2 has three storage chambers 21, 22, and 23, corresponding to the three nuts 4A, 4B, and 4C, respectively. The nut 4 is a regular polygonal square nut. In the illustrated example, the nut 4 is a nut having a square shape in plan view. The nuts 4A, 4B, and 4C are individually stored in the storage chambers 21, 22, and 23, respectively.

The holder 5 is a member that supports the nuts 4A, 4B, and 4C. The holder 5 is molded using an insulating synthetic resin, for example. The holder 5 has three support units 51, 52, and 53 corresponding to the nuts 4A, 4B, and 4C, respectively (refer to FIG. 9). The support units 51, 52, and 53 hold the nut 4 by setting the threaded hole of the nut 4 to face the through hole of the busbar 3.

The busbar 3 is a conductor formed of a conductive metal plate. As illustrated in FIG. 4, the busbar 3 includes a first terminal portion 31, a second terminal portion 32, an intermediate portion 33, and a supported portion 34. The first terminal portion 31 is formed in a plate-like shape and has a through hole 31a. The through hole 31a penetrates the central portion of the first terminal portion 31 in a plate thickness direction. The through hole 31a is a hole through which a shaft portion of the bolt is inserted. The first terminal portion 31 is fastened to a terminal to be connected together by a bolt and the nut 4. The first terminal portion 31 has a pair of edges 31b and 31b. The pair of edges 31b and 31b is located on either side in a first direction X across the through hole 31a. The pair of edges 31b and 31b is integrated with the housing 2 and held by the housing 2.

In the illustrated example, the second terminal portion 32 is a male terminal having a cylindrical shape. The second terminal portion 32 is formed by rounding a metal plate into a cylindrical shape. The second terminal portion 32 has a resin body 6 formed by insert molding. The resin body 6 includes: a cap portion 61 for preventing finger touch; and a block portion 62. The cap portion 61 and the block portion 62 are connected to each other inside the second terminal portion 32. The block portion 62 has a substantially rectangular parallelepiped shape.

The intermediate portion 33 is a portion connecting the first terminal portion 31 and the second terminal portion 32 to each other. The busbar 3 has a bent portion 35 bent at a right angle between the first terminal portion 31 and the intermediate portion 33. Therefore, the intermediate portion 33 is orthogonal to the main surface of the first terminal portion 31. The intermediate portion 33 is bent at a plurality of positions between the first terminal portion 31 and the second terminal portion 32. In the illustrated example, the housing 2 is molded integrally with the intermediate portion 33 and holds the intermediate portion 33.

The supported portion 34 is a portion supported by the housing 2. The busbar 3 has a bent portion 36 bent at a right angle between the first terminal portion 31 and the supported portion 34. That is, the supported portion 34 is orthogonal to the main surface of the first terminal portion 31. In the illustrated example, the housing 2 is molded integrally with the supported portion 34. That is, in the terminal block 1 of the present embodiment, both sides of the first terminal portion 31 are integrated with the housing 2 and held by the housing 2. On a side surface of the supported portion 34, there is provided a recess 34a recessed in a width direction of the supported portion 34. This enhances the holding force with which the housing 2 holds the supported portion 34. This suppresses deformation of the busbar 3 when the first terminal portion 31 and the mating terminal are fastened to each other.

FIG. 5 illustrates a positional relationship among the busbars 3A, 3B, and 3C in a state of being held by the housing 2. The housing 2 holds the busbars 3A, 3B, and 3C in a state where the three first terminal portions 31 are arranged at intervals in one direction. In the description of the terminal block 1, the arrangement direction of the first terminal portions 31 is referred to as a "first direction X". A direction orthogonal to the first direction X in a plan view of the first terminal portion 31 is referred to as a "second direction Y". A direction orthogonal to both the first direction X and the second direction Y is referred to as a "third direction Z".

As illustrated in FIG. 5, the bent portion 36 is bent such that the supported portion 34 extends in the third direction Z. The supported portion 34 faces the intermediate portion 33 in the second direction Y. The intermediate portion 33 and the supported portion 34 can improve rigidity of the storage chambers 21, 22, and 23, and can suppress deformation of the storage chambers 21, 22, and 23 in a fastening process.

As illustrated in FIGS. 1 to 3, the housing 2 includes a main body 20, a fitting portion 24, and a storage block 25. The main body 20, the fitting portion 24, and the storage block 25 are integrated with each other. The main body 20 has a substantially rectangular parallelepiped shape. The main body 20 holds the intermediate portion 33 of the busbar 3 and the collars 11 and 12.

The fitting portion 24 protrudes from the side surface of the main body 20 in the first direction X. The fitting portion 24 is a portion to be fitted to a mating connector and has a tubular shape. As illustrated in FIG. 2, the three second terminal portions 32 are stored in the fitting portion 24. The second terminal portion 32 is connected to a female terminal of the mating connector.

The storage block 25 is a portion that stores the nut 4 and the holder 5. The first terminal portion 31 of the busbar 3 is supported by the storage block 25. As illustrated in FIG. 6, the storage block 25 has a rectangular shape in plan view. The direction of the long side of the storage block 25 is the first direction X.

The storage block 25 has a recess 26 recessed in the third direction Z. As illustrated in FIGS. 6 and 7, the deeper part of the recess 26 is divided into the storage chambers 21, 22, and 23. More specifically, the storage block 25 includes partitions 27 and 28. The partition 27 partitions the two storage chambers 21 and 22 from each other. The partition 28 partitions the two storage chambers 22 and 23 from each other.

The partition 27 has walls 27a and 27b and a locking portion 27c. The walls 27a and 27b extend to the deeper part of the recess 26 in the third direction Z. The walls 27a and 27b face each other in the first direction X. The wall 27a is a wall forming the storage chamber 21. As illustrated in FIG. 7, the end of the wall 27a holds the first terminal portion 31 of the busbar 3A. The wall 27b is a wall forming the storage chamber 22. The end of the wall 27b holds the first terminal portion 31 of the busbar 3B. The locking portion 27c is provided between the walls 27a and 27b. The locking portion 27c is a portion that locks the holder 5 and protrudes in the second direction Y. More specifically, the locking portion 27c protrudes toward the side opposite to the main body 20 side.

The partition 28 has walls 28a and 28b and a locking portion 28c. The walls 28a and 28b extend to the deeper part of the recess 26 in the third direction Z. The walls 28a and 28b face each other in the first direction X. The wall 28a is a wall forming the storage chamber 22. The end of the wall 28a holds the first terminal portion 31 of the busbar 3B. The wall 28b is a wall forming the storage chamber 23. The end of the wall 28b holds the first terminal portion 31 of the busbar 3C. The locking portion 28c is provided between the walls 28a and 28b. The locking portion 28c is a portion that locks the holder 5 and protrudes in the second direction Y. As illustrated in FIG. 8, the locking portion 28c protrudes toward the main body 20 side.

As illustrated in FIG. 7, the housing 2 is molded integrally with the edge 31b of the first terminal portion 31. The housing 2 supports the first terminal portion 31 in each of the first direction X and the third direction Z. Therefore, the housing 2 can support the first terminal portion 31 when the bolt 8 is fastened to the nut 4, making it possible to suppress deformation of the first terminal portion 31.

As illustrated in FIGS. 9 and 10, the holder 5 includes a main body 50, three support units 51, 52, and 53, and two engagement pieces 54 and 55. The holder 5 is molded from insulating synthetic resin, for example. The main body 50, the support units 51, 52, and 53, and the engagement pieces 54 and 55 are integrated to each other. As illustrated in FIG. 10, the shape of the holder 5 has rotational symmetry about a central axis CL. More specifically, when the holder 5 is rotated by 180 degrees about the central axis CL as the rotation center, the shape of the holder 5 before rotation and the shape after rotation coincide with each other.

The main body 50 has a substantially rectangular parallelepiped shape. The main body 50 has side surfaces 50a, 50b, 50c, and 50d. The side surfaces 50a and 50b are side surfaces in the long side of the main body 50, and face in second direction Y. The side surfaces 50c and 50d are side surfaces in the short side of the main body 50, and face in first direction X. The side surfaces 50c and 50d are orthogonal to the side surfaces 50a and 50b. That is, the cross-sectional shape of the main body 50 in the cross section orthogonal to the third direction Z is rectangular.

Each of the side surfaces 50a, 50b, 50c, and 50d of the main body 50 is provided with a Rib 56. The rib 56 extends in the third direction Z. In other words, the rib 56 extends in an insertion direction in which the holder 5 is inserted into the recess 26. Each of the side surfaces 50a and 50b has two ribs 56. One of the two ribs 56 is disposed corresponding to the support unit 51. The other one of the two ribs 56 is disposed corresponding to the support unit 53. That is, on each of the side surfaces 50a and 50b, the two ribs 56 are located at both ends in the first direction X.

Each of the side surfaces 50c and 50d has one rib 56. On each of the side surfaces 50c and 50d, the rib 56 is located at the central portion in the second direction Y. The cross-sectional shape of the rib 56 in the cross section orthogonal to the third direction Z is an arc shape. As illustrated in FIG. 9, there is provided an inclined surface 56a at the tip end of the rib 56. Here, the tip end of the rib 56 is an end that first comes into contact with the wall surface of the recess 26 in the process of inserting the holder 5 into the recess 26. The inclined surface 56a is inclined such that the height of the rib 56 decreases toward the tip end of the rib 56. The inclined surfaces 56a of the respective ribs 56 are provided at the same position in the third direction Z. The inclined surface 56a has a centering function of guiding the holder 5 to a normal position in the recess 26 and a function of suppressing inclination of the holder 5 with respect to the recess 26. The centering function of the rib 56 eliminates the need for a structure such as a guide rail for guiding the holder 5. In addition, the ribs 56 can suppress generation of ions and occurrence of damage to the holder 5 when vibration or impact is input from the outside.

The support units 51, 52, and 53 protrude from the main body 50 in the third direction Z. The support units 51, 52, and 53 are arranged at intervals in the first direction X. The support units 51, 52, and 53 have a square shape in a cross section orthogonal to the third direction Z. Each of the support units 51, 52, and 53 has a recess 57 corresponding to the threaded hole of the nut 4. The recess 57 is recessed in the third direction Z from the tip end surface of each of the support units 51, 52, and 53.

The engagement pieces 54 and 55 protrude from the main body 50 in the third direction Z. The engagement pieces 54 and 55 are each formed in an arm shape, and include, on their tip end portions, claws 54a and 55a, respectively. One engagement piece 54 is positioned between the two support units 51 and 52. The other engagement piece 55 is positioned between the two support units 52 and 53. The claws 54a and 55a protrude in the second direction Y. The protruding directions of the two claws 54a and 55a are mutually opposite directions. That is, when the claw 54a is engaged with the locking portion 27c of the housing 2, the claw 55a is engaged with the locking portion 28c. On the other hand, when the claw 54a is engaged with the locking portion 28c, the claw 55a is engaged with the locking portion 27c.

As illustrated in FIG. 11, the nuts 4A, 4B, and 4C are stored in the storage chambers 21, 22, and 23, respectively. The holder 5 is engaged with the housing 2 and supports the nuts 4A, 4B, and 4C. More specifically, the support unit 51 is inserted into the storage chamber 21 and supports the nut 4A. The support unit 51 is located on the side opposite to the first terminal portion 31 side with respect to the nut 4A, and supports the nut 4A by setting the threaded hole 41 of the nut 4A to face the through hole 31a. Similarly, the support unit 52 is inserted into the storage chamber 22 to support the nut 4B, and the support unit 53 is inserted into the storage chamber 23 to support the nut 4C.

FIG. 12 illustrates the terminal block 1 when assembled to a device 100. The device 100 is a device mounted on a vehicle, and an example of this is a power control unit (PCU) interposed between a power supply and a traveling motor. The first terminal portion 31 of the busbar 3 is connected to the terminal 101 of the device 100. The device 100 supplies an electric current to the motor via the terminal 101. The terminal 101 is a terminal of an ammeter, for example. The terminal 101 of the corresponding phase is fastened to each of the three first terminal portions 31. The ammeter measures a value of electric current flowing between the power supply and the motor. The terminal 101 is a terminal formed in a plate-like shape and having a through hole, and is overlaid with the first terminal portion 31.

The bolt 8 is inserted through the through hole of the terminal 101 and the through hole 31a of the first terminal portion 31 so as to be screwed to the nut 4. The terminal 101 and the first terminal portion 31 are fastened together by the bolt 8 and the nut 4. The shaft portion of the bolt 8 enters deep into the recess 57. Chips (shavings) generated when the bolt 8 and the nut 4 are screwed are stored in the recess 57.

As illustrated in FIG. 13, the storage chambers 21, 22, and 23 have wall surfaces facing the respective side surfaces of the nut 4, making it possible to restrict the rotation of the nut 4. The storage chamber 21 has wall surfaces 21a, 21b, 21c, and 21d. The wall surfaces 21a, 21b, and 21d are wall surfaces of an outer peripheral wall of the storage block 25. The wall surface 21c is a wall surface of the wall 27a. The wall surfaces 21a and 21b face each other in the second direction Y. The wall surfaces 21c and 21d face each other in the first direction X. In the storage chamber 21, the four wall surfaces 21a, 21b, 21c, and 21d supports the four side surfaces of the nut 4A, thereby restricting the rotation of the nut 4A. The storage chambers 21, 22, and 23 have a slight gap between the side surface of the nut 4 and the wall surface so that the nut 4 can move in the third direction Z. The size of the gap may be a value with which the nut 4 can be aligned.

The storage chamber 22 has wall surfaces 22a, 22b, 22c, and 22d. The wall surfaces 22a and 22b are wall surfaces of the outer peripheral wall of the storage block 25. The wall surface 22c is a wall surface of the wall 28a, while the wall surface 22d is a wall surface of the wall 27b. The wall surfaces 22a and 22b face each other in the second direction Y. The wall surfaces 22c and 22d face each other in the first direction X. In the storage chamber 22, four wall surfaces 22a, 22b, 22c, and 22d support four side surfaces of the nut 4B, thereby restricting the rotation of the nut 4B.

The storage chamber 23 has wall surfaces 23a, 23b, 23c, and 23d. The wall surfaces 23a, 23b, and 23c are wall surfaces of the outer peripheral wall of the storage block 25. The wall surface 23d is a wall surface of the wall 28b. The wall surfaces 23a and 23b face each other in the second direction Y. The wall surfaces 23c and 23d face each other in the first direction X. In the storage chamber 23, four wall surfaces 23a, 23b, 23c, and 23d supports four side surfaces of the nut 4C, thereby restricting the rotation of the nut 4C.

As illustrated in FIG. 13, in the storage block 25, the wall having the wall surfaces 21a, 22a, and 23a is formed integrally with the intermediate portion 33 of the busbar 3. That is, the busbar 3 supports the wall surfaces 21a, 22a, and 23a by the intermediate portion 33, making it possible to suppress deformation of the wall surfaces 21a, 22a, and 23a when the bolt 8 is fastened to the nut 4. The wall having the wall surfaces 21b, 22b, and 23b is formed integrally with the supported portion 34 of the busbar 3. That is, the busbar 3 supports the wall surfaces 21b, 22b, and 23b, making it possible to suppress deformation of the wall surfaces 21b, 22b, and 23b at the time of fastening.

As illustrated in FIG. 14, the holder 5 is engaged with the housing 2 by the engagement piece 55. The locking portion 28c of the housing 2 locks the claw 55a of the holder 5. Similarly, the locking portion 27c of the housing 2 locks the claw 54a of the holder 5. As illustrated in FIG. 12, the device 100 has an opposing wall 102 that restricts the holder 5 from falling off. The opposing wall 102 faces the holder 5 in the third direction Z. The opposing wall 102 supports the holder 5 so as to prevent the holder 5 and the nut 4 from falling when the claw 55a and the locking portion 28c are disengaged or when the claw 54a and the locking portion 27c are disengaged. It is also allowable to set a part of the holder 5 to protrude from the recess 26 so as to be able to more reliably restrict the holder 5 from falling. For example, the height of the holder 5 may be set to allow the holder 5 to come into contact with the opposing wall 102 in a state where the housing 2 is fixed to the device 100.

Here, a method of manufacturing the housing 2 according to the present embodiment will be described. In the illustrated example, the housing 2 is molded by a primary molding process and a secondary molding process. In the primary molding process, the resin body 6 illustrated in FIG. 4 is molded with the second terminal portion 32 of the busbar 3. In the primary molding process, the resin body 6 is molded integrally with second terminal portion 32 having a cylindrical shape, by using insert molding. The block portion 62 of the resin body 6 is formed at a base end of the second terminal portion 32.

Figure 15:
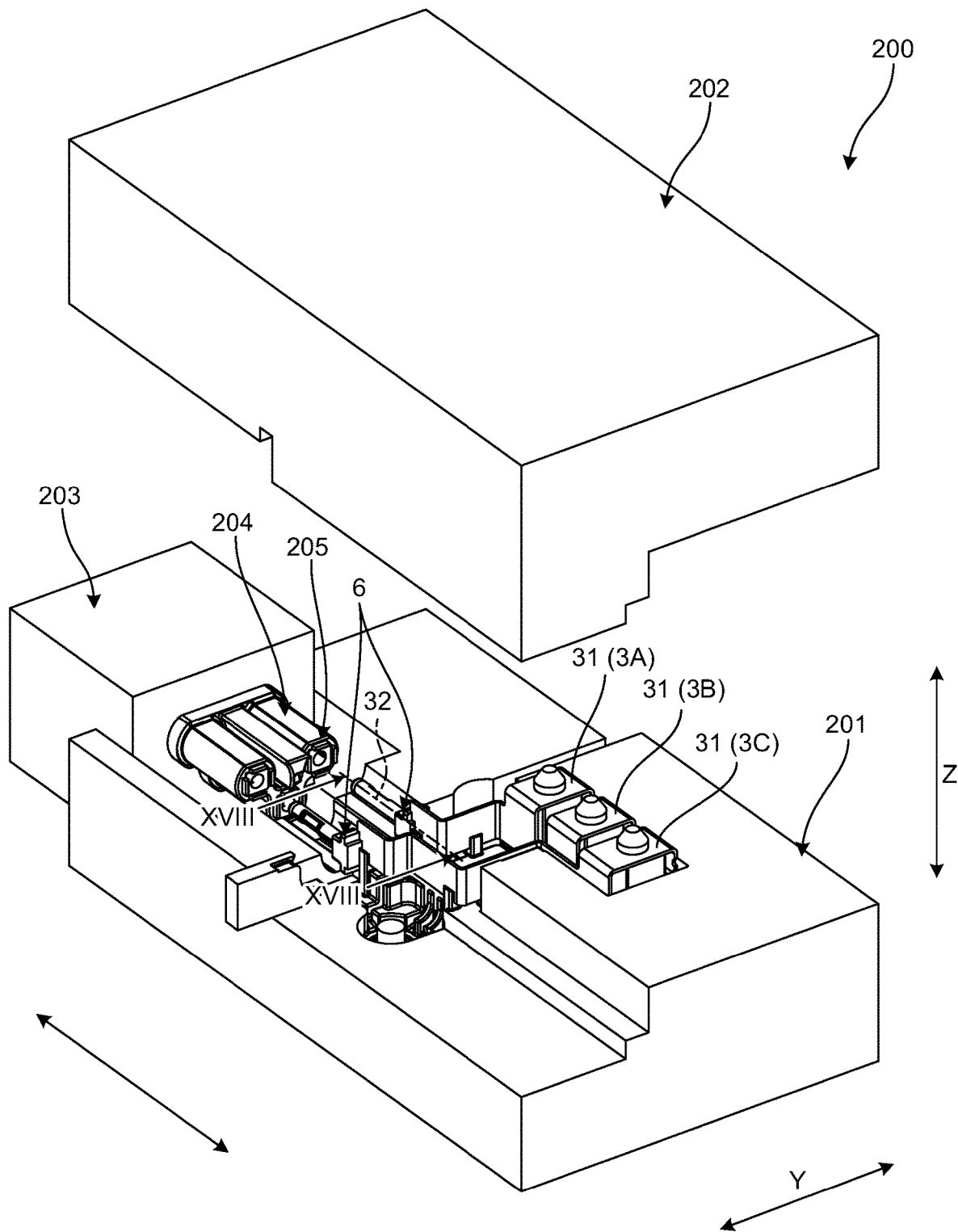
FIG. 15 is a perspective view of a mold according to the embodiment.

In the secondary molding process, the housing 2 is formed by insert molding with the busbar 3 having the resin body 6. FIG. 15 illustrates a mold 200 used in the process of secondary molding. The mold 200 includes a first mold 201, a second mold 202, and a slide 203. The first mold 201 is a mold that supports the busbar 3 from below. The second mold 202 is a mold that moves relative to the first mold 201 in the third direction Z. The slide 203 is a mold that moves relative to the first mold 201 in the first direction X. As described below, the slide 203 is configured to hold the resin body 6.

The slide 203 has a column 204 forming the fitting portion 24 of the housing 2. The column 204 protrudes in the first direction X. The column 204 includes, in its tip end surface, a holding unit 205 that holds the resin body 6.

Figure 16:
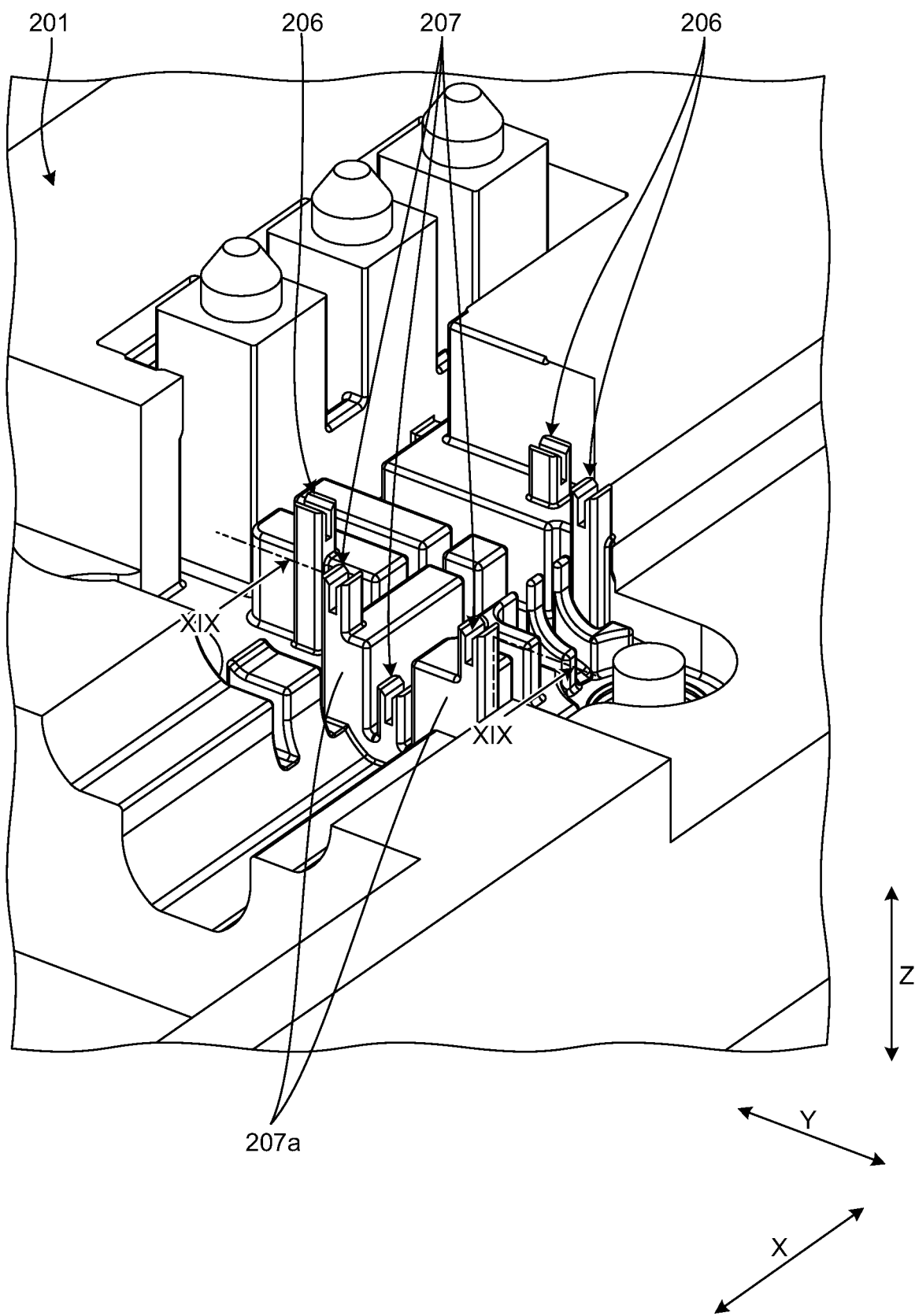
FIG. 16 is a perspective view of the mold according to the embodiment.

As illustrated in FIG. 16, the first mold 201 has a plurality of first support units 206 and three second support units 207. The first support unit 206 supports the intermediate portion 33 of the busbar 3. The first mold 201 has a plurality of first support units 206 for one busbar 3. The first support unit 206 protrudes in the third direction Z and has a slit into which the intermediate portion 33 is inserted. The plurality of first support units 206 includes the first support unit 206 having a slit in the first direction X and the first support unit 206 having a slit in the second direction Y.

One second support unit 207 is provided for one busbar 3. The second support unit 207 supports an end of the intermediate portion 33 on the second terminal portion 32 side. The second support unit 207 has a slit into which the intermediate portion 33 is inserted, and has a support surface 207a that supports the resin body 6.

Figure 17:
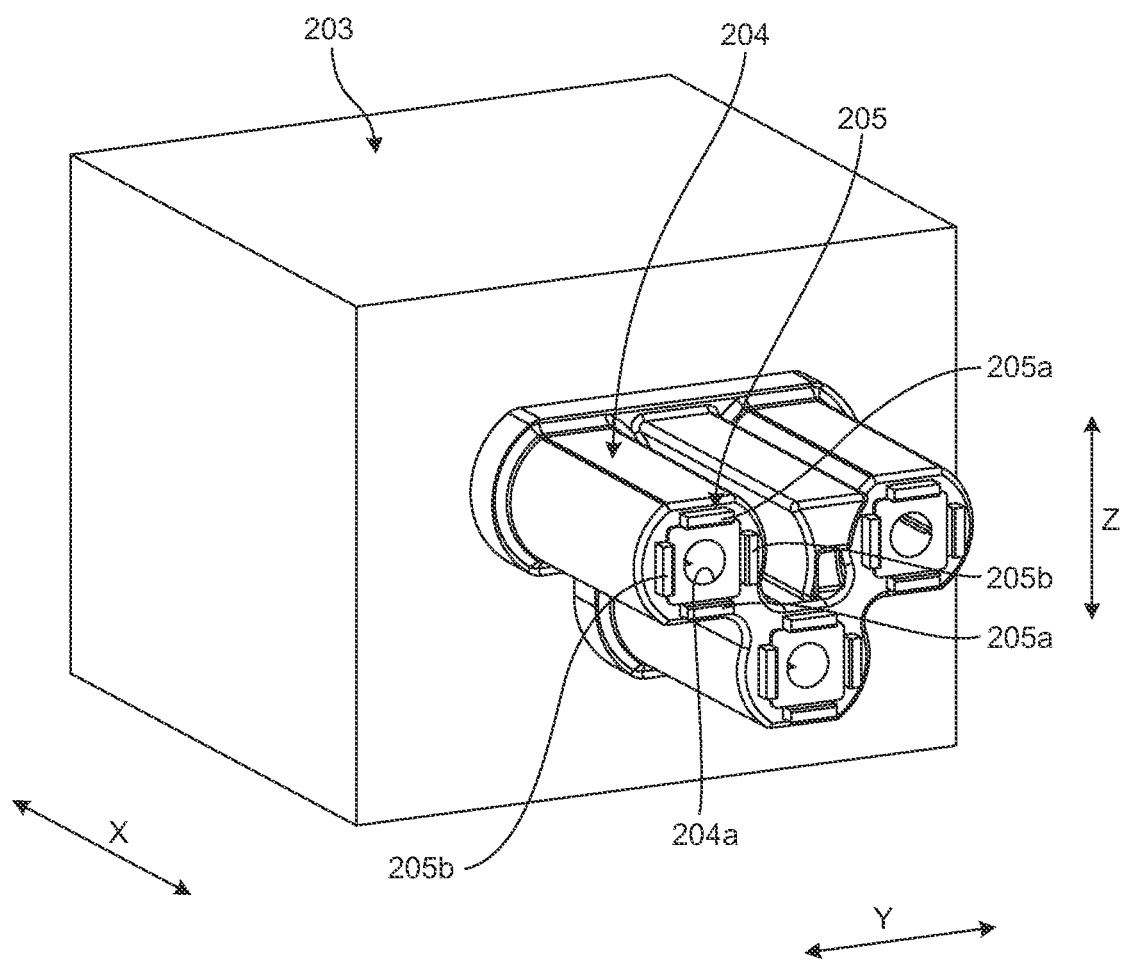
FIG. 17 is a perspective view of the mold according to the embodiment.

As illustrated in FIG. 17, the column 204 has a recess 204a into which the second terminal portion 32 is inserted. The holding unit 205 has a pair of first protrusions 205a and 205a, each having a bar shape, and a pair of second protrusions 205b and 205b, each having a bar shape. One first protrusion 205a is disposed on one side in the third direction Z with respect to the recess 204a, while the other first protrusion 205a is disposed on the other side in the third direction Z with respect to the recess 204a. The pair of first protrusions 205a and 205a extends in the second direction Y and faces each other in the third direction Z. The first protrusions 205a and 205a are configured to sandwich the block portion 62 of the resin body 6 from both sides in the third direction Z.

One second protrusion 205b is disposed on one side in the second direction Y with respect to the recess 204a, while the other second protrusion 205b is disposed on the other side in the second direction Y with respect to the recess 204a. The pair of second protrusions 205b and 205b extends in the third direction Z and faces each other in the second direction Y. The second protrusions 205b and 205b are configured to sandwich the block portion 62 of the resin body 6 from both sides in the second direction Y.

Figure 18:
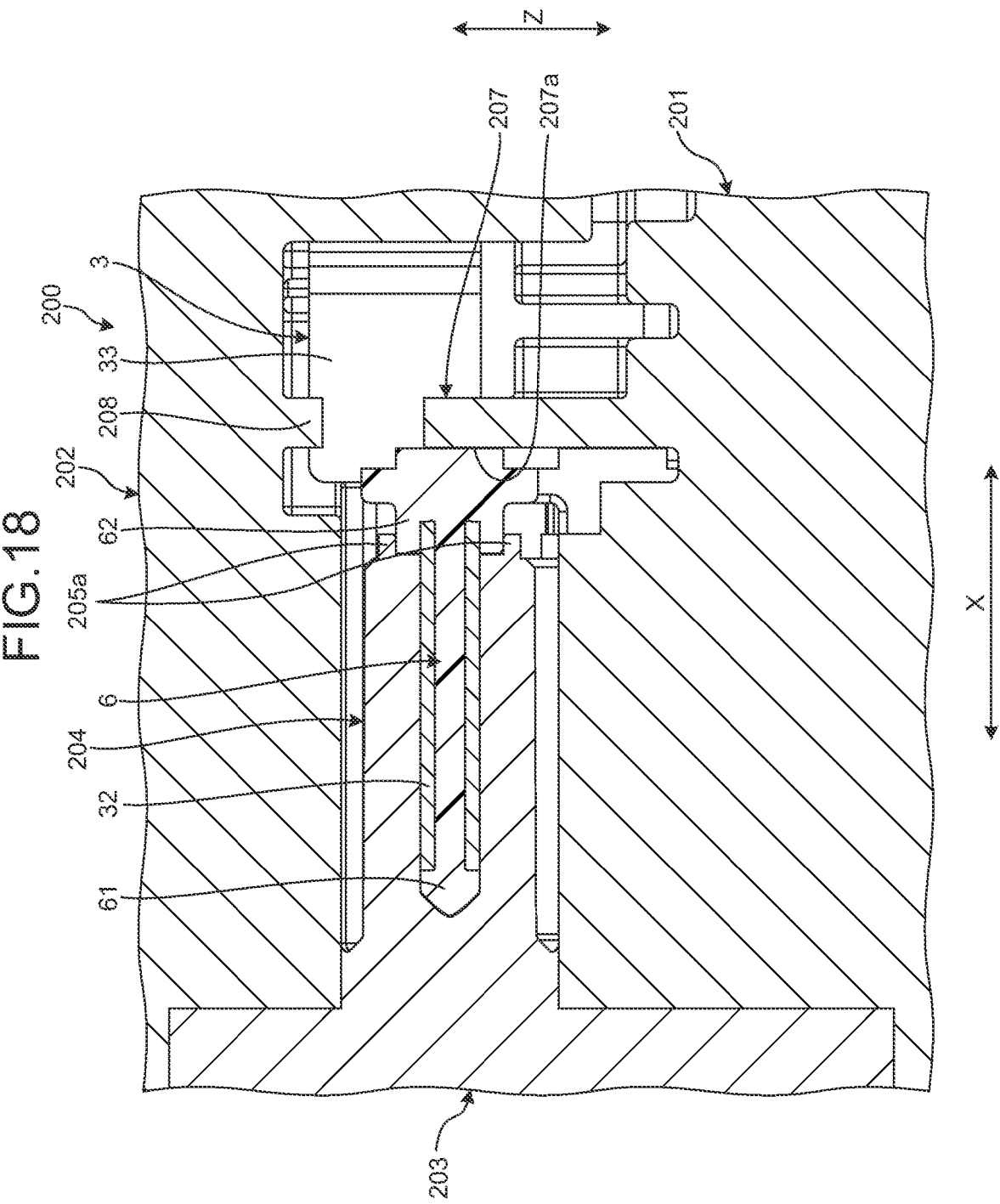
FIG. 18 is a cross-sectional view of the mold at the stage of being set the mold according to the embodiment taken along line XVIII in FIG. 15.

FIG. 18 illustrates the busbar 3 held by the first mold 201, the second mold 202, and the slide 203. The second mold 202 includes a plurality of support units 208. More specifically, the second mold 202 includes: a plurality of support units 208 facing the respective first support units 206; and three support units 208 facing the three second support units 207. The support unit 208 has a slit into which the intermediate portion 33 is inserted.

The mold 200 sandwiches the intermediate portion 33 from both sides in the third direction Z by the first support unit 206 and the corresponding support unit 208. Furthermore, the mold 200 sandwiches the end of the intermediate portion 33 from both sides in the third direction Z by the second support unit 207 and the corresponding support unit 208.

As illustrated in FIG. 18, the second terminal portion 32 of the busbar 3 is stored in the column 204. A tip end surface of the column 204 comes in contact with on the block portion 62 so as to close a space in which the second terminal portion 32 is stored. The block portion 62 is sandwiched from both sides in the third direction Z by the pair of first protrusions 205a and 205a. Similarly, the block portion 62 is sandwiched from both sides in the second direction Y by the pair of second protrusions 205b and 205b. That is, the slide 203 chucks the four surfaces of the block portion 62. The support surface 207a of the first mold 201 supports the block portion 62 from the side opposite to the slide 203 side. That is, the block portion 62 is sandwiched from both sides in the first direction X by the support surface 207a and the column 204. Therefore, the block portion 62 is accurately positioned in each of the first direction X, the second direction Y, and the third direction Z.

By injecting resin into the space of the mold 200, the housing 2 is molded integrally with the busbar 3. In the method for manufacturing the terminal block 1 according to the present embodiment, the mold 200 holds the second terminal portion 32 via the resin body 6 in the secondary molding process. That is, the mold 200 indirectly chucks the second terminal portion 32 via the resin body 6. This makes it possible to suppress damage to the second terminal portion 32, peeling of plating, and the like. In addition, since the four surfaces of the block portion 62 are held by the holding unit 205, the positional accuracy of the second terminal portion 32 is improved. Furthermore, since the block portion 62 is supported by the support surface 207a, the positional accuracy of the second terminal portion 32 is improved.

As described above, the terminal block 1 according to the present embodiment includes the busbar 3, the housing 2, the nut 4, and the holder 5. The busbar 3 includes: the first terminal portion 31 formed in a plate-like shape and having a through hole 31a; and the second terminal portion 32. The housing 2 holds the busbar 3 and includes the storage chambers 21, 22, and 23. The storage chambers 21, 22, and 23 face the first terminal portion 31 in the axial direction of the through hole 31a. The nut 4 is stored in the storage chambers 21, 22, and 23. The holder 5 has the support units 51, 52, and 53 that support the nut 4, and is attached to the housing 2.

The storage chambers 21, 22, and 23 have wall surfaces facing the individual side surfaces of the nut 4, and the wall surfaces restrict the rotation of the nut 4. As an illustrated example, the storage chambers 21, 22, and 23 have the same number of wall surfaces as the number of side surfaces of the nut 4. The support units 51, 52, and 53 are located on the side opposite to the first terminal portion 31 side with respect to the nut 4. The support units 51, 52, and 53 support the nut 4 by setting the threaded hole 41 of the nut 4 to face the through hole 31a. The terminal block 1 of the present embodiment has a wall surface facing each side surface of the nut 4. For example, the storage chamber 21 has four wall surfaces 21a, 21b, 21c, and 21d individually facing the four side surfaces of the nut 4. This makes it possible for the terminal block 1 to receive a load when the bolt 8 is fastened to the nut 4 in a state where the load is distributed to the wall surfaces 21a, 21b, 21c, and 21d. This makes it possible to form the storage block 25 thinner, leading to downsizing of the terminal block 1.

The busbar 3 of the present embodiment includes: the intermediate portion 33 connecting the first terminal portion 31 and the second terminal portion 32 to each other; and the supported portion 34 provided on the tip end side of the first terminal portion 31. The housing 2 is molded integrally with the intermediate portion 33 and the supported portion 34. That is, the busbar 3 is held by the housing 2 on both sides of the first terminal portion 31. This suppresses deformation of the busbar 3 when the bolt 8 is fastened to the nut 4. This makes it possible to reliably fasten the nut 4 and the bolt 8 to each other without applying a large fastening torque.

The supported portion 34 of the present embodiment is bent toward the storage chambers 21, 22, and 23 with respect to the first terminal portion 31. In the housing 2, walls surrounding the storage chambers 21, 22, and 23 are molded integrally with the supported portion 34. By extending the supported portion 34 along the storage chambers 21, 22, and 23, it is possible to increase a contact area between the supported portion 34 and the housing 2.

The terminal block 1 of the present embodiment includes the plurality of busbars 3A, 3B, and 3C. The housing 2 holds the plurality of busbars 3A, 3B, and 3C in a state where the plurality of first terminal portions 31 is arranged at intervals in the first direction X. The housing 2 has the plurality of storage chambers 21, 22, and 23 corresponding to the plurality of first terminal portions 31. The holder 5 has a plurality of support units 51, 52, and 53 corresponding to the plurality of storage chambers 21, 22, and 23, and also has the engagement pieces 54 and 55 each being provided between two adjacent support units out of the support units 51, 52, and 53. The holder 5 is engaged with the housing 2 by the engagement pieces 54 and 55. With the engagement structure disposed between the adjacent busbars 3, it is possible to downsize the housing 2.

The housing 2 of the present embodiment has the recess 26 into which the holder 5 is press-fitted. The holder 5 has the two side surfaces 50c and 50d facing in first direction X and the two side surfaces 50a and 50b facing in the second direction Y. The two side surfaces 50c and 50d facing in the first direction X each have the rib 56 in the insertion direction in which the holder 5 is inserted into the recess 26. The two side surfaces 50a and 50b facing in the second direction Y each have the rib 56 in the insertion direction. Since the ribs 56 are provided individually on the four side surfaces, the holder 5 is appropriately positioned in each of the first direction X and the second direction Y.

MODIFICATION OF EMBODIMENT

The number of the busbars 3 and the nuts 4 included in the terminal block 1 is not limited to three. The shape of the second terminal portion 32 is not limited to a cylindrical shape. The second terminal portion 32 may be formed in a plate-like shape similar to the shape of the first terminal portion 31. The shape of the nut 4 is not limited to the rectangular shape. For example, the shape of the nut 4 may be hexagonal. In this case, it is preferable that the storage chambers 21, 22, and 23 each have six wall surfaces facing the respective side surfaces of the nut 4.

The contents disclosed in the above embodiments and modification examples can be executed in appropriate combination with each other.

In the terminal block according to the present embodiment, the storage chamber of the housing has wall surfaces facing the individual side surfaces of the nut, and these wall surfaces restrict the rotation of the nut. This makes it possible to achieve both downsizing of the storage chamber and maximization of the contact area between the storage chamber and the nut. According to the terminal block of the present invention, it is possible to achieve downsizing of the housing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal block comprising:
   a busbar including a first terminal portion and a second terminal portion, the first terminal portion formed in a plate-like shape and having a through hole;
   a housing that holds the busbar and has a storage chamber having an opening facing the first terminal portion in an axial direction of the through hole;
   a nut stored in the storage chamber; and
   a holder including a support unit that supports the nut, the holder configured to be attached to the housing,
   wherein the storage chamber has wall surfaces facing individual side surfaces of the nut, the storage chamber configured to restrict rotation of the nut by using the wall surfaces of the storage chamber, and
   the support unit is positioned on a side opposite to a side of the first terminal portion with respect to the nut, the support unit configured to support the nut by setting a threaded hole of the nut to face the through hole, and
   wherein the busbar includes: an intermediate portion connecting the first terminal portion and the second terminal portion to each other; and a supported portion provided on a tip end side of the first terminal portion, and
   the housing is molded integrally with the intermediate portion and the supported portion.

2. The terminal block according to claim 1,
   wherein the housing has a recess into which the holder is press-fitted,
   the holder has two side surfaces facing a first direction and two side surfaces facing a second direction orthogonal to the first direction,
   the two side surfaces facing the first direction each have a rib in an insertion direction in which the holder is inserted into the recess, and
   two side surfaces facing the second direction each have a rib in the insertion direction.

3. The terminal block according to claim 2,
   wherein the housing has a recess into which the holder is press-fitted,
   the holder has two side surfaces facing a first direction and two side surfaces facing a second direction orthogonal to the first direction,
   the two side surfaces facing the first direction each have a rib in an insertion direction in which the holder is inserted into the recess, and
   two side surfaces facing the second direction each have a rib in the insertion direction.

4. The terminal block according to claim 1, further comprising
   a plurality of the busbars,
   wherein the housing holds the plurality of busbars in a state where the plurality of first terminal portions is arranged at intervals in a first direction,
   the housing includes a plurality of the storage chambers corresponding to the plurality of first terminal portions, and
   the holder includes a plurality of the support units corresponding to the plurality of storage chambers, the housing also including an engagement piece provided between two adjacent support units out of the plurality of support units, the holder configured to be engaged with the housing by the engagement piece.

5. The terminal block according to claim 4,
   wherein the housing has a recess into which the holder is press-fitted,
   the holder has two side surfaces facing a first direction and two side surfaces facing a second direction orthogonal to the first direction,
   the two side surfaces facing the first direction each have a rib in an insertion direction in which the holder is inserted into the recess, and
   two side surfaces facing the second direction each have a rib in the insertion direction.

6. The terminal block according to claim 1,
   wherein the supported portion is bent toward the storage chamber with respect to the first terminal portion, and
   walls of the housing surrounding the storage chamber are molded integrally with the supported portion.

7. The terminal block according to claim 6,
   wherein the housing has a recess into which the holder is press-fitted,
   the holder has two side surfaces facing a first direction and two side surfaces facing a second direction orthogonal to the first direction,
   the two side surfaces facing the first direction each have a rib in an insertion direction in which the holder is inserted into the recess, and
   two side surfaces facing the second direction each have a rib in the insertion direction.

8. The terminal block according to claim 6, further comprising
   a plurality of the busbars,
   wherein the housing holds the plurality of busbars in a state where the plurality of first terminal portions is arranged at intervals in a first direction,
   the housing includes a plurality of the storage chambers corresponding to the plurality of first terminal portions, and the holder includes a plurality of the support units corresponding to the plurality of storage chambers, the housing also including an engagement piece provided between two adjacent support units out of the plurality of support units, the holder configured to be engaged with the housing by the engagement piece.

9. The terminal block according to claim 6, wherein the housing has a recess into which the holder is press-fitted, the holder has two side surfaces facing a first direction and two side surfaces facing a second direction orthogonal to the first direction, the two side surfaces facing the first direction each have a rib in an insertion direction in which the holder is inserted into the recess, and two side surfaces facing the second direction each have a rib in the insertion direction.

\* \* \* \* \*